(12) United States Patent
Anderson

(10) Patent No.: US 10,907,756 B2
(45) Date of Patent: Feb. 2, 2021

(54) CLAMP APPARATUS AND METHOD FOR JOINING PIPELINE SEGMENTS

(71) Applicant: John Anderson, Hawthorne, WI (US)

(72) Inventor: John Anderson, Hawthorne, WI (US)

( * ) Notice: Subject to any disclaimer, the term of this patent is extended or adjusted under 35 U.S.C. 154(b) by 582 days.

(21) Appl. No.: 15/685,616

(22) Filed: Aug. 24, 2017

(65) Prior Publication Data

US 2018/0058614 A1 Mar. 1, 2018

Related U.S. Application Data

(60) Provisional application No. 62/379,475, filed on Aug. 25, 2016.

(51) Int. Cl.
| | | |
|---|---|---|
| *F16L 21/06* | (2006.01) | |
| *F16L 13/02* | (2006.01) | |
| *F16L 1/10* | (2006.01) | |
| *B23K 37/053* | (2006.01) | |
| *F16L 3/12* | (2006.01) | |
| *F16L 23/036* | (2006.01) | |
| *F16L 3/133* | (2006.01) | |

(52) U.S. Cl.
CPC .......... *F16L 21/06* (2013.01); *B23K 37/0533* (2013.01); *F16L 1/10* (2013.01); *F16L 3/1211* (2013.01); *F16L 3/1222* (2013.01); *F16L 13/02* (2013.01); *F16L 3/133* (2013.01); *F16L 23/036* (2013.01)

(58) Field of Classification Search
CPC ... F16L 21/06; F16L 1/10; F16L 13/02; F16L 3/1211; F16L 3/1222; B23K 37/0533
See application file for complete search history.

(56) References Cited

U.S. PATENT DOCUMENTS

| | | | | |
|---|---|---|---|---|
| 2,167,887 A | * | 8/1939 | Graham | B23K 37/0533 269/128 |
| 2,800,867 A | * | 7/1957 | Smith | B23K 37/0533 269/189 |
| 3,422,519 A | * | 1/1969 | Fehlman | B23K 37/0533 29/281.5 |

* cited by examiner

*Primary Examiner* — James M Hewitt, II
(74) *Attorney, Agent, or Firm* — Kagan Binder, PLLC

(57) ABSTRACT

The disclosure of the invention provides a clamping apparatus and methods for joining segments of pipeline. The clamping apparatus includes first and second clamp assembly portions, each having at least two pivotable arms that clamp on to ends of two pipeline segments, respectively. The apparatus includes bridging members positioned within the gap connecting first and second clamp assembly portions. The bridging member has a central portion between and radially distal to first and second portions. The arrangement of the central portion provides a continuous open area around the circumference at the pipeline junction so a weld can be made with high precision and efficiency.

13 Claims, 9 Drawing Sheets

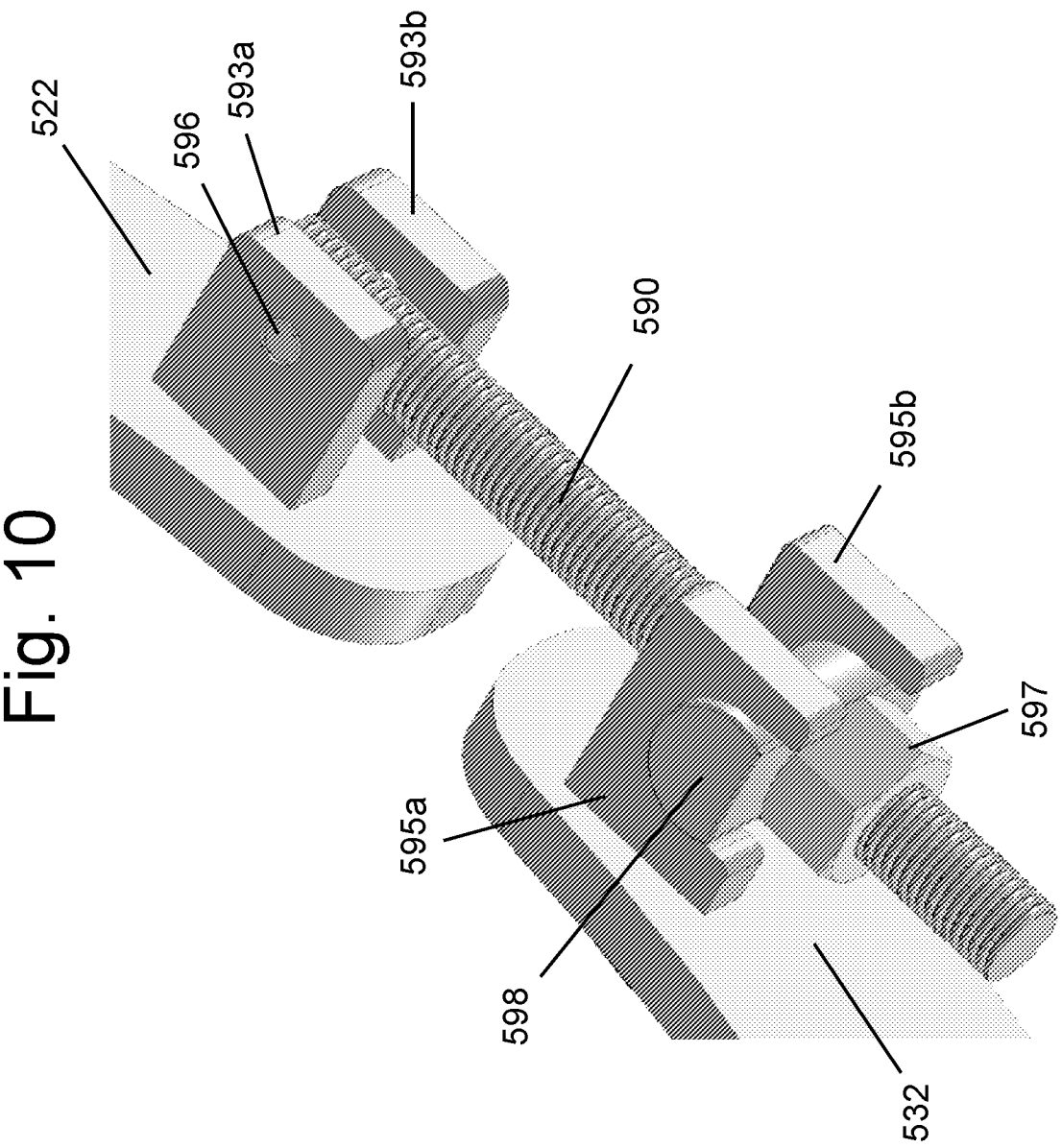

CLAMP APPARATUS AND METHOD FOR JOINING PIPELINE SEGMENTS

CROSS-REFERENCE TO RELATED APPLICATION

The present non-provisional Application claims the benefit of commonly owned provisional Application having Ser. No. 62/379,475, filed on Aug. 25, 2016, entitled "CLAMP APPARATUS AND METHOD FOR JOINING PIPELINE SEGMENTS", which Application is incorporated herein by reference in its entirety.

FIELD OF INVENTION

The invention is directed to pipeline construction and maintenance, and equipment to facilitate associated methods.

BACKGROUND

Pipelines, such as those that carry natural gas or oil, are typically separated into segments of certain lengths, such as segments that are about 40 to about 80 feet long. Pipeline construction or maintenance can involve connecting one segment to another segment at a junction between the two. Construction may also include pipe bending using a bending machine with clamps and hydraulic pressure to make slight bends in the pipe to provide proper pipeline direction.

Segments of pipeline can be joined at a junction using a welding process. Prior to welding the segments of pipeline should be aligned with a high degree of accuracy. Also, welding the segments of pipeline should be carried out with high precision and efficiency.

SUMMARY

The invention provides a clamp apparatus and method that facilitates the joining of pipeline segments. The apparatus can be used at a junction between two segments of pipeline to align and hold the segments in a desired manner. The apparatus facilitates the accurate and efficient joining of the segments at the junction, such as by welding.

In one embodiment, the invention provides a clamp apparatus for joining pipeline segments. The apparatus includes first and second clamp assembly portions that can form a ring shape in a closed configuration. The first and second clamp assembly portions are parallel to each other and are separated by a gap, and have an inner lateral surface. Each of the first and second clamp assembly portions have (at least) first and second arms. The first arm is directly or indirectly attached to and pivotable in relation to the second arm, with the arms being pivotable to provide the clamp apparatus in open and closed configurations. The clamp apparatus also includes two or more bridging members positioned within the gap that connects the first and second clamp assembly portions. The bridging members have a first portion, second portion, and central portion. The first and second portions are attached to the inner lateral surfaces of the first and second clamp members, respectively. The bridging member is configured so the central portion is radially distal to either the first or second portions and its configuration provides a gap between the first and second portions. The gap provides an advantageous working area to facilitate joining of the pipeline segments, such as by welding.

Accordingly, the invention also provides a method for joining pipeline segments. In the method the clamp apparatus is provided around the circumference of a junction of first and second pipeline segments. The clamp apparatus aligns the segments along a pipeline axis at the junction. After the segments are aligned, they are fixed together by placing a portion of a fixing apparatus, such as a welding apparatus, at a location between the central portion of the bridging member and the junction between the two segments. For example, a weld can be formed around the circumference of the pipeline by moving a portion of a welding apparatus around the junction and within the gap between the bridging member and the pipeline surface. The features of the clamp apparatus, including the space in the gap provided by the bridging member design, allow the segments of pipeline to be welded together quickly and with a high degree of precision.

BRIEF DESCRIPTION OF DRAWINGS

FIG. 10 is a perspective view of a latching system of an embodiment of the clamp apparatus.

DETAILED DESCRIPTION

Generally the disclosure describes a clamp apparatus that facilitates the joining of pipeline segments. Components of the clamp apparatus are used at a junction between two segments of pipeline to align and hold the segments in a desired manner. The apparatus facilitates the efficient joining of the segments at the junction, such as by welding.

In order to explain aspects of the clamp apparatus and its use in conjunction with a pipeline, terms such as "upper," "lower," "below," "above," "inner," and "outer," etc., can be used to indicate the position of components or features of the clamp apparatus when it is in a working arrangement. A "working arrangement" can be when the clamping apparatus is clamped at a junction of two ends of pipeline segments. In methods of the disclosure, the terms "vertical," and "horizontal," and "level" may also be used to indicate the position of components or features of the clamp apparatus when it is in a working arrangement. For example, a component of the clamping apparatus that is in a "horizontal" position is parallel with the horizon, and one in a "vertical" position is one perpendicular with the horizon. Further, terms such as "proximal" and "distal" can be used to describe the positional relationship of the clamping apparatus of the disclosure, or parts thereof relative to the pipeline. For example, features of the apparatus that are closer to the pipeline's center may be referred to "radially proximal", whereas those further from the pipeline's center may be referred to "radially distal." The terms such as "proximal" and "distal" can be used to describe the positional relationship of one feature of the clamping apparatus in relation to another feature of the clamping apparatus.

Figure 4:
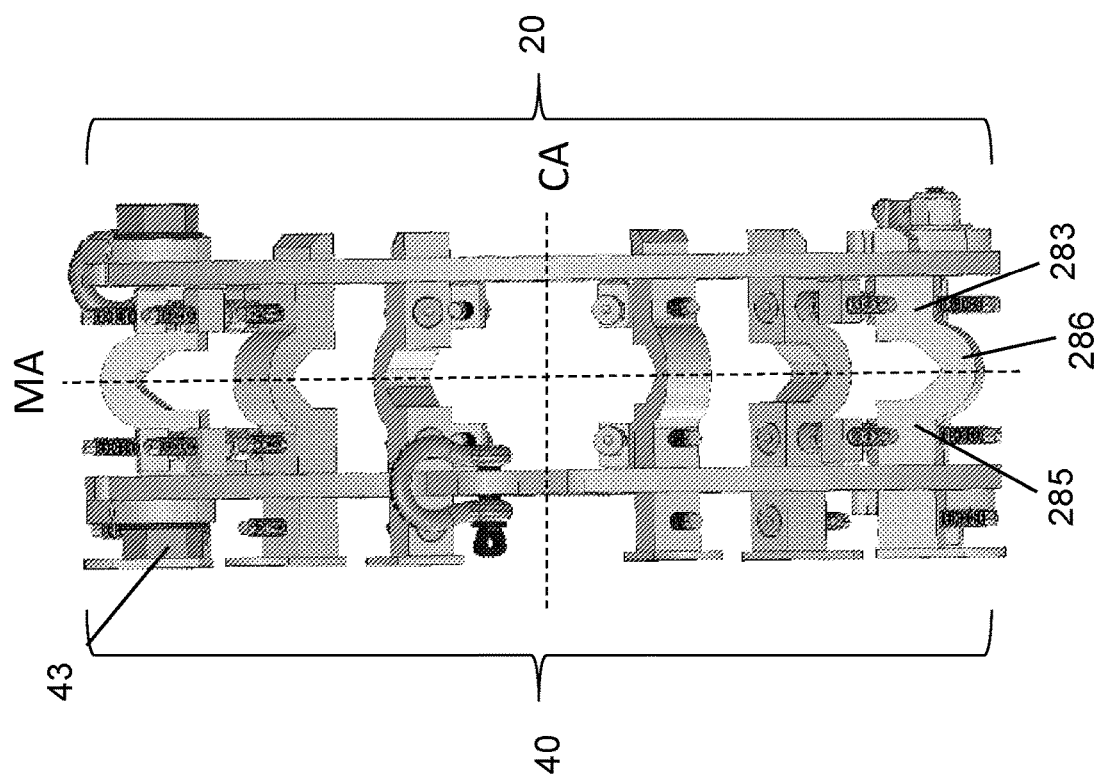
FIG. 4 is a side view of an embodiment of the clamp apparatus.

With reference to FIG. 4, features of the clamp apparatus can be explained in relation to a central axis CA that passes through each center point of the first clamp assembly portion 20 and the second clamp assembly portion 40. The central axis CA can be coincident with or parallel to a pipeline axis, which is the line along the center of the pipeline, parallel to its length. For example, features of the apparatus that are closer to the central axis can be referred to "radially proximal", whereas those further from the central axis may be referred to "radially distal."

Also with reference to FIG. 4, the clamp apparatus can be defined by a medial axis MA that is perpendicular to the central axis CA and located at a midpoint between the first clamp assembly portion 20 and the second clamp assembly portion 40 The medial axis MA can define a medial plane between the first and second clamp assembly portions. For example, features of the apparatus that are closer to the medial axis can be referred to as proximal, whereas those further from the medial axis may be referred to distal.

Figure 1:
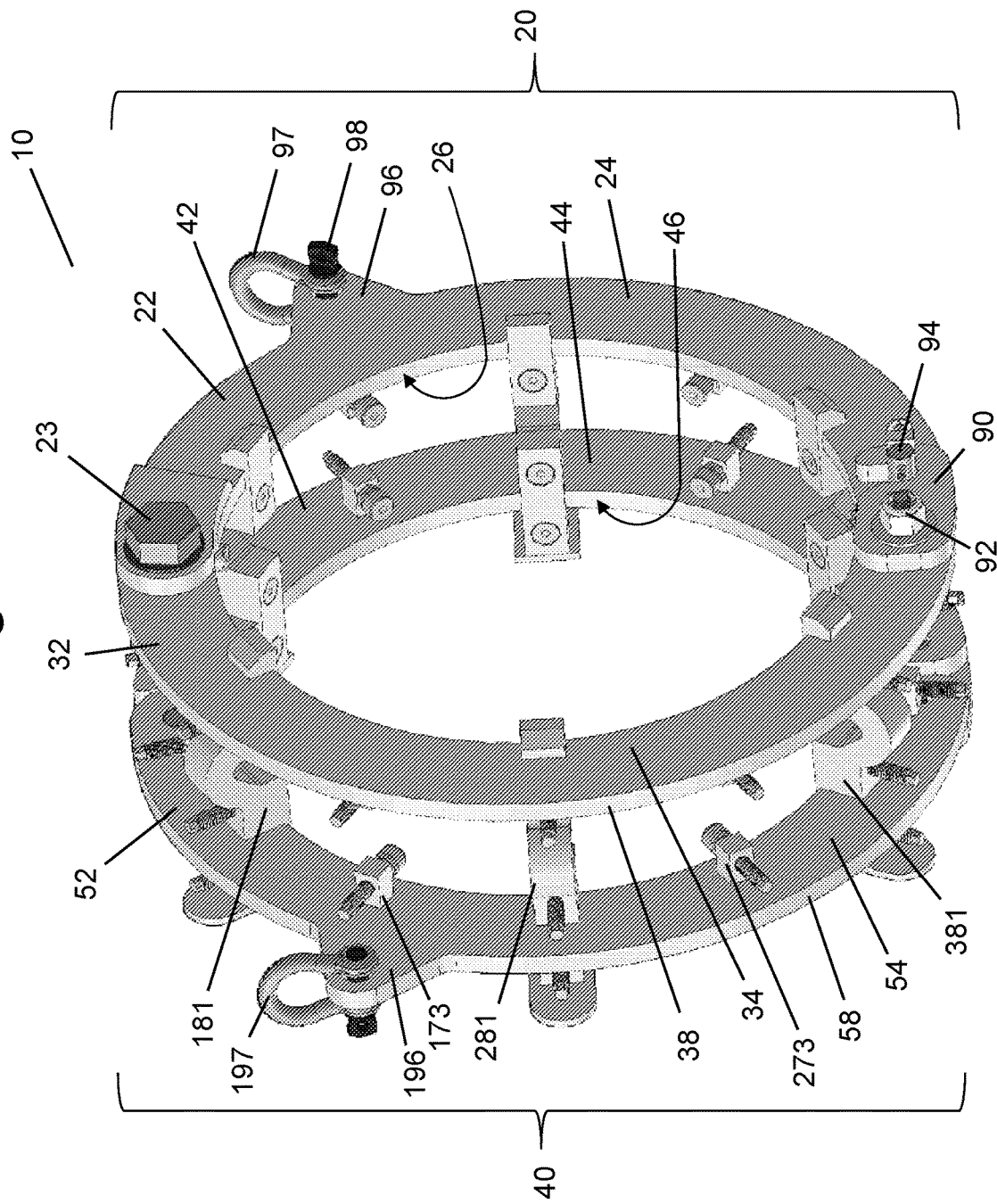
FIG. 1 is a perspective view of an embodiment of the clamp apparatus.

Referring to FIG. 1, the first clamp assembly portion 20 includes first arm 22 and second arm 32. The second clamp assembly portion 40 includes first arm 42 and second arm 52. The arms can be pivotable in relation to one another. In embodiments, the first and second arms can have a curved configuration and can represent a portion of a circle.

Figure 2B:
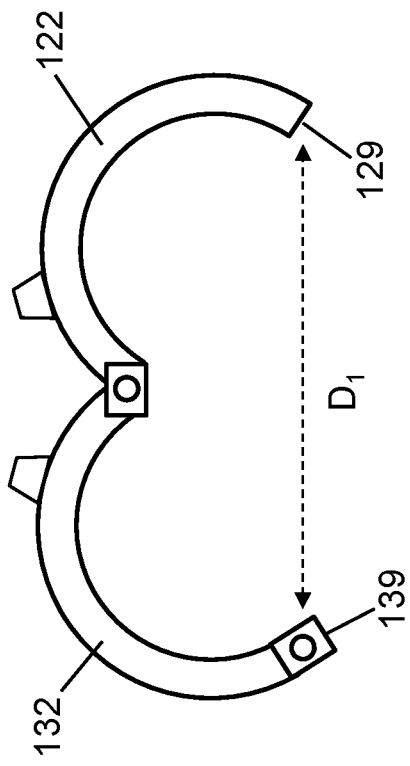
FIGS. 2A and 2B are end (lateral) views of an embodiment of the clamp apparatus in a closed (2A) and open (2B) configuration.
Figure 3B:
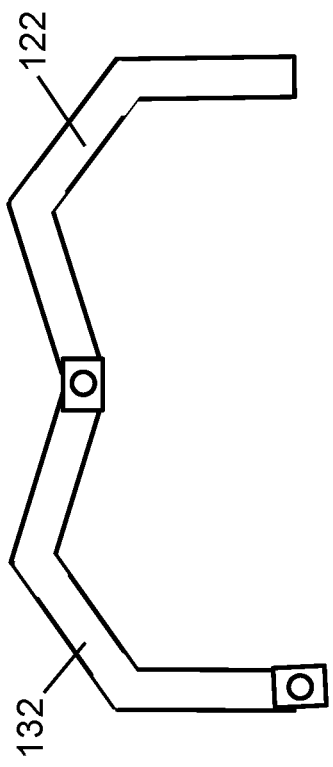
FIGS. 3A and 3B are end (lateral) views of another embodiment of the clamp apparatus in a closed (3A) and open (3B) configuration.
Figure 2A:
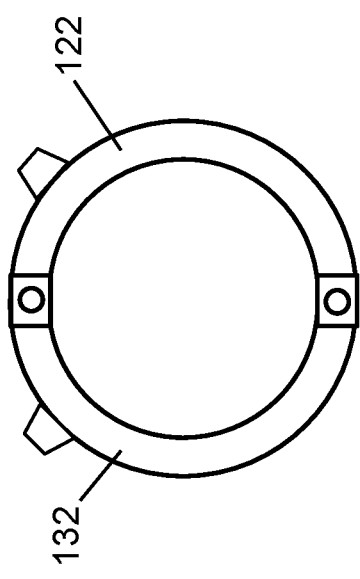
Figure 3A:
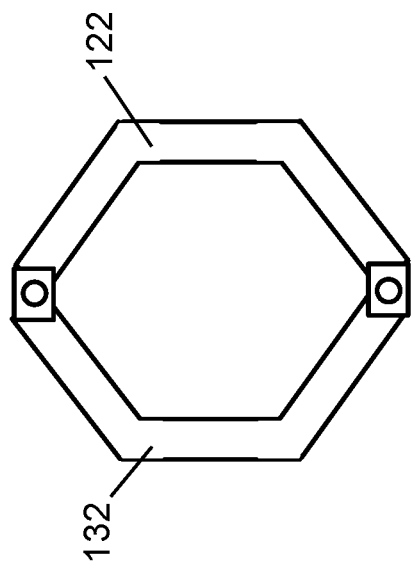

With reference to FIGS. 2A and 2B, the clamping apparatus can have "closed" and "opened" configurations. In embodiments, both first arm 122 and second arm 132 have a "C" (semicircular) shape. In a closed configuration, the clamping apparatus has a circular shape when viewed from one end. FIG. 2B shows the clamping apparatus in an open configuration. The first arm 122 and second arm 132 can be pivoted to provide a desired distance $D_1$ between the ends (129, 139) of the arms. Generally $D_1$ will be at least the diameter of the pipeline that the claim is applied to. The first and second clamp assemblies in a closed configuration are able to encompass the outer diameter of the pipeline.

Figure 9:
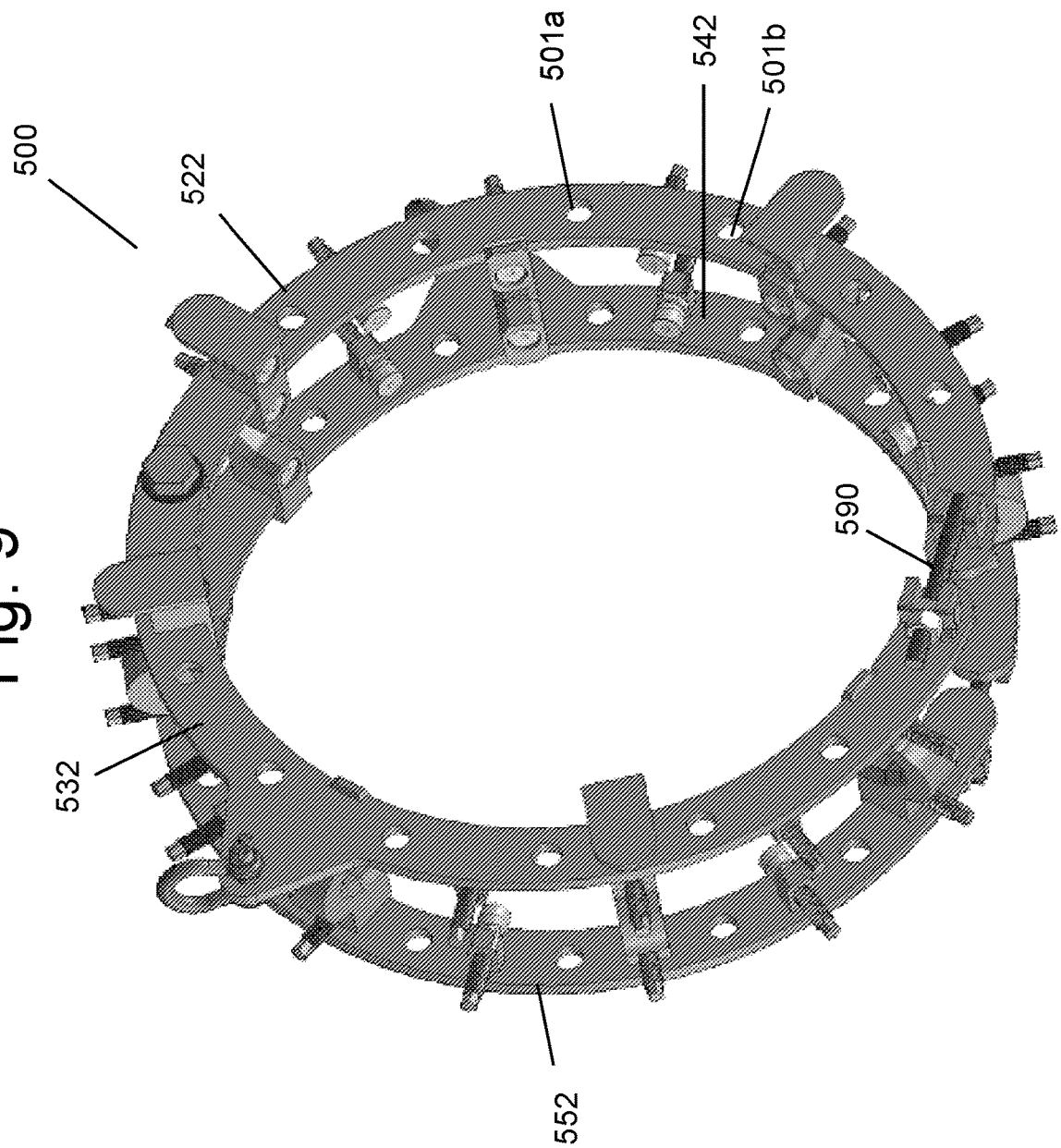
FIG. 9 is a perspective view of another embodiment of the clamp apparatus.

In some embodiments and as shown in FIG. 1, the first and second arms (22 and 32, and 42 and 52) can have a substantially flat shape. For example, arm 22 has an outer lateral surface 24, an inner lateral surface (not shown), an inner radial surface 26, and an outer radial surface (not shown). Arm 32 has an outer lateral surface 34, an inner lateral surface (not shown), an outer radial surface 38, and an inner radial surface (not shown). Arm 42 has an inner lateral surface 44, an outer lateral surface (not shown), an inner radial surface 46, and an outer radial surface (not shown). Arm 52 has an inner lateral surface 54, an outer lateral surface (not shown), an outer radial surface 58, and an inner radial surface (not shown). In a similar embodiment as shown in FIG. 9, clamp apparatus 500 has first clamp assembly portion with first arm 522 and second arm 532, and second clamp assembly portion with first arm 542 and second arm 552. The clamp (e.g., FIG. 1, FIG. 9) can have a gap between the inner lateral surfaces of the arms of the first and second portions that in the range of 4 inches to 10 inches, or 6 inches to 8 inches.

In embodiments, the width of the outer and/or inner lateral surfaces (e.g., 24, 44, 34, 54) of the arms can be greater than the width of the inner and/or outer radial surfaces. For example, the width of the outer and/or inner lateral surfaces can be in the range of about 2.5 to about 6, about 3.5 to about 5, or about 4 to about 4.5 times greater than the width of the inner and/or outer radial surfaces. In embodiments, the outer and/or inner lateral surface can have a width in the range of about 1.5 inches to about 6 inches, or about 2 inches to about 4 inches. The outer and/or inner radial surface can have a depth in the range of about 0.5 inch to about 1 inch, or about 0.63 inch to about 0.75 inch. For example, the clamp apparatus as shown in FIG. 1 has an outer/inner lateral surface and outer/inner radial surface with greater widths, respectively, that the outer/inner lateral surface and outer/inner radial surface widths of the clamp apparatus of FIG. 9, which can reduce overall clamp apparatus weight. The outer and inner lateral surfaces can have a width that is preferably the same or about the same, although the widths can be different. Likewise, the outer and inner radial surfaces can have a width that is preferably the same or about the same, although the widths can be different.

In some embodiments, one or more of the first arm and/or second arm of the first and/or second clamp assembly portion(s), includes one or more apertures. The apertures can be of any size or shape, but preferably do not compromise the structural integrity of the clamp assembly in use for joining pipeline segments. Referring to FIG. 9, the apertures (501a, 501b, etc.) have a circular shape and a periodically spaced apart on the first (522, 542, etc.) and second (532, 552, etc.) arms of the first and or second clamp assembly portions. The presence of apertures can reduce the overall weight of the clamp apparatus thereby increasing its maneuverability during a clamping process.

Figure 5:
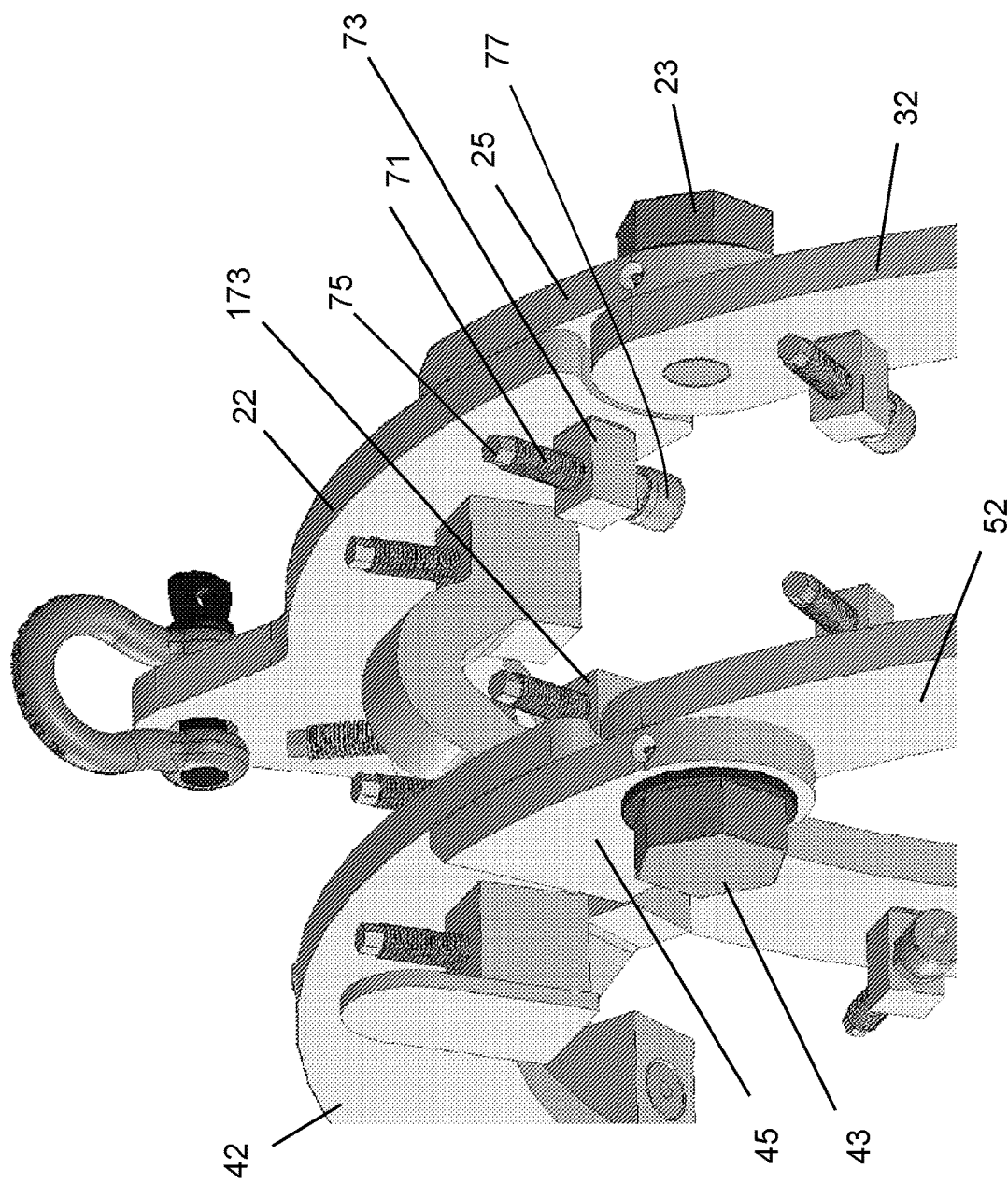
FIG. 5 is a perspective view of the upper portion of an embodiment of the clamp apparatus.

The first and second arms (22 and 32, and 42 and 52) are pivotable in relation to one another. With reference to FIG. 5, the upper portions of second arms (32 and 52) can include openings through which a connecting member, such as a bolt (23 and 43), can be passed. The clamp apparatus can include an arm connection member (25 and 45) that connects the first arm (22, 42) to the second arm (32, 52). The arm connection member can be disposed and attached to the outer lateral surface of an arm. In some embodiments, the arm connection member (25 and 45) has a first portion that is fastened to (such as by welding) and immovable in relation to the first arm (22 and 42). The arm connection member (25 and 45) can also have a second portion that is connected to the second arm (32 and 52). The second arm can include a post (not shown) that extends outwards (i.e. from the medial plane), which is disposed through an opening in the arm connection member (25 and 45). The post can include threads and a bolt (23 and 43) which can be used to attach the second arm (32 and 52) to the arm connection member (25 and 45). The second arm (32 and 52) can pivot on this post and therefore is pivotably movable in relation to the arm connection member (25 and 45)/first arm (22 and 42).

Figure 7:
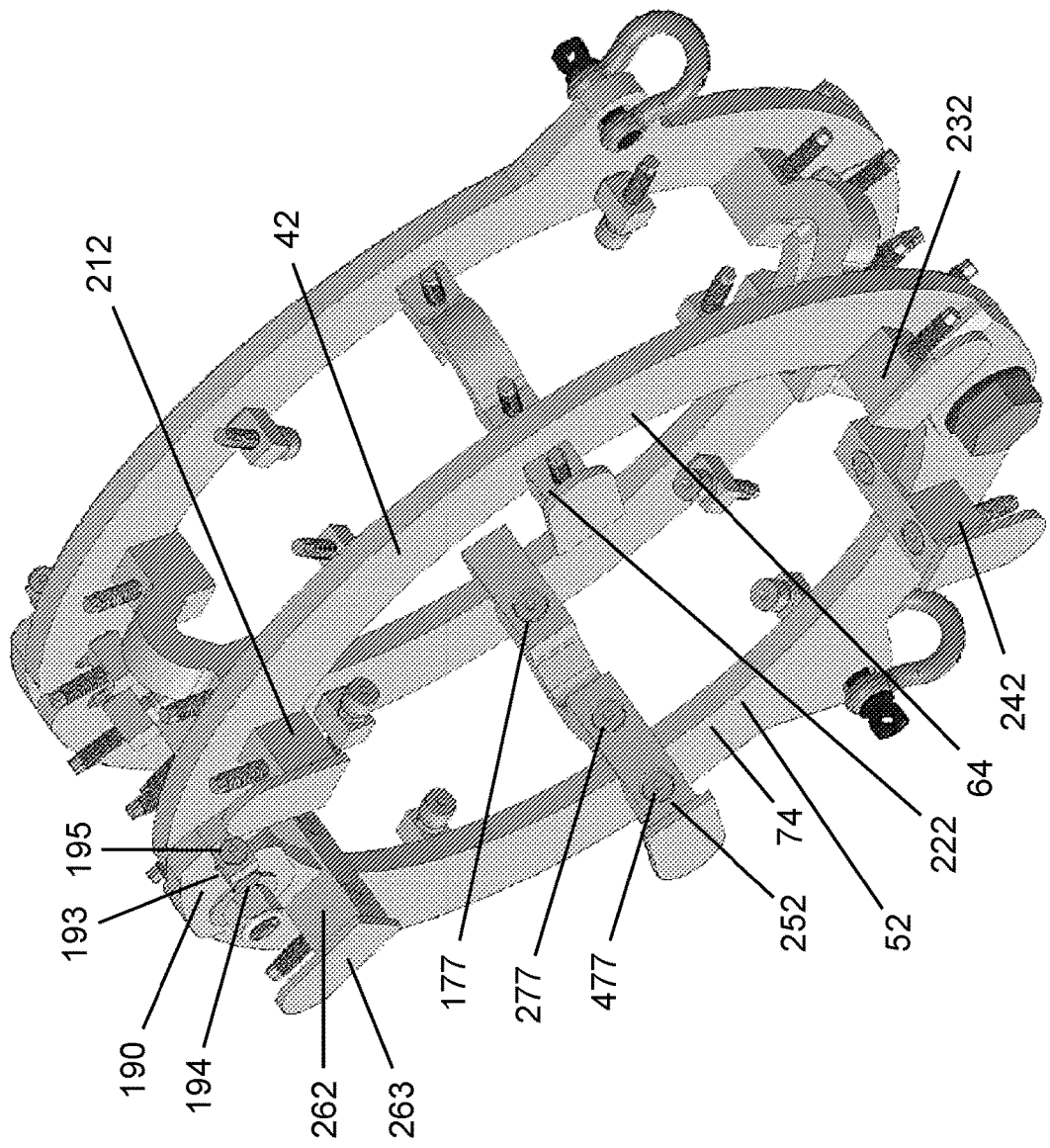
FIG. 7 is another perspective view of an embodiment of the clamp apparatus.

Referring back to FIG. 1, the apparatus can also include a latch arm 90 that secures the lower end of arm 22 to the lower end of arm 32 to lock the clamping apparatus in a closed configuration. The latch arm 90 can be disposed on the outer lateral surface 34 of the arm 32, and can pivot on bolt 92 which is disposed through an opening in the arm 32. Latch arm 90 can include a recess in its inner radial portion configured to accommodate post 94 when the latch is swung shut. Referring to FIG. 7, the apparatus can also include a corresponding latch arm 190 disposed on the outer lateral surface 74 of the arm 54. As seen in the same figure, latch arm 190 includes a lateral projection 193 having an opening which is in alignment with an opening in post 194. Pin 195 can be sized to fit through the openings in the projection 193 and post 194 to secure the latch arm 190 in a locked position, thereby locking first arm 42 and second arm 52 in a closed configuration.

An alternate latch arrangement is shown in FIG. 9, and in more detail in FIG. 10. Latch arm 590, which is in the form of a threaded post, secures the lower end of arm 522 to the lower end of arm 532 to lock the clamping apparatus in a closed configuration. Latch arm 590 can be attached to the outer lateral surface of the lower end of arm 522, which can include lateral projections 593a and 593b. A first end of latch arm 590 can be positioned between and pivotably secured to the lateral projections 593a and 593b using a bolt that passes through the arm and the projections. Latch arm 590 can swing outwards in an open configuration. In a locked or closed configuration, a second end of latch arm 590 can be positioned between two lateral projections 595a and 595b, which extend from the lateral surface of the lower end of arm 532. Lateral projections 595a and 595b, can include recesses configured to accommodate a brace member 598. Brace member 598 can include an opening sized to accommodate the diameter of the latch arm 590 and through which latch arm 590 is disposed. To provide the latch in a locked or closed configuration nut 597 can be rotated about the threads of latch arm 590 to force brace member 598 against the inner surfaces of the recesses of lateral projections 595a and 595b.

The apparatus can also include an extension member that facilitates attachment to a lifting device, such as a hoist. For example, referring to FIG. 1, arm 22 can include radial extension portion 96 which extends outwards from the outer radial surface of the arm. The radial extension portion 96 can taper radially outwards and therefore have a triangular shape. The hoist attachment member 96 can be attached to a lifting shackle 97 using a bolt 98 which is disposed through openings in the outer portion of the attachment member 96 and lifting shackle 97.

The apparatus can also include a plurality of adjustable supports that are attached to the arms and that have radially proximal portions that contact the pipe surface when in use. The radially proximal portions can apply pressure to the pipeline from a plurality of angles around the pipeline circumference, providing the contact points for the clamp. For example, with reference to FIG. 5, an adjustable support includes a threaded post 71 having threads along most of its length. A portion of the threaded post 71 can be rotatably disposed within a threaded opening of an extension member 73. Extension member 73 can be formed of a solid piece of material (e.g., metal) that is attached (e.g., by welding) to the inner lateral surface of any one or more arm(s) (first arm 22, second arm 32, first arm 42, second arm 52). Extension member 73 can extend inwards a portion of the distance between the inner lateral surfaces of arms 22 and 42 (i.e., it does not bridge the inner lateral surfaces, and therefore provides a gap between the opposing extension member 173). The inner arm extension member 73 can be attached to the inner lateral surface of the arm at a location that is closer to the inner radial surface than to the outer radial surface. In embodiments, at least one extension member 73 is attached to the inner lateral surface of each arm. In some embodiments, with reference to FIG. 1, an arm (e.g., second arm 52) has two extension members (e.g., 173, 273) which are attached to the inner lateral surface of the arm at locations between each bridging member (e.g., 181, 281, 381).

Optionally, one or more extension members may be attached to an outer later lateral surface of the arms. Extension members can be in "pairs" opposite one another can attached to corresponding locations on the inner lateral surface of each arm.

The radially distal end 75 of the threaded post 71 can have a shape (e.g., hexagonal) configured for attachment of a tool, such as a wrench or socket. The threaded post 71 can be rotated to effect its movement radially inwards or outwards. The radially proximal end includes a base 77 (such as a pad or cup) configured for contacting the outer surface of a pipeline. Base 77 is attached to, but can be rotationally independent from the threaded post 71. That is, threaded post 71 can be rotated to cause its movement radially inwards, and when base 77 comes in contact and frictionally engaged with the outer surface of the pipeline base 77 can be remains rotationally stationary, and pressure can be applied to the pipeline surface through the threaded post 71 and extension member 73. The inner radial surface of the base 77 may also have a concave shape that matches the curvature of the outer diameter of the pipe.

With reference to FIG. 4, the clamp apparatus also includes bridging members that connect the arms of the first clamp assembly portion 20 to the arms of the second clamp assembly portion 40. That is, the bridging members are positioned within the gap and connect the arms of the first and second clamp assembly portions. For example, with reference to FIG. 1, the bridging members 181, 281, 381 connect the second arm 32 of the first clamp assembly portion 20 to the second arm 52 of the second clamp assembly portion 40.

A bridging member can include a first portion, a second portion, and a central portion. The first and second portions are attached to the inner lateral surfaces of the first and second arms of the clamp assembly. The central portion is between the first and second portions and configured so that it is radially distal to either the first or second portions. The arrangement of the central portion provides a gap between first or second portions of sufficient size to allow work to be done.

Figure 6:
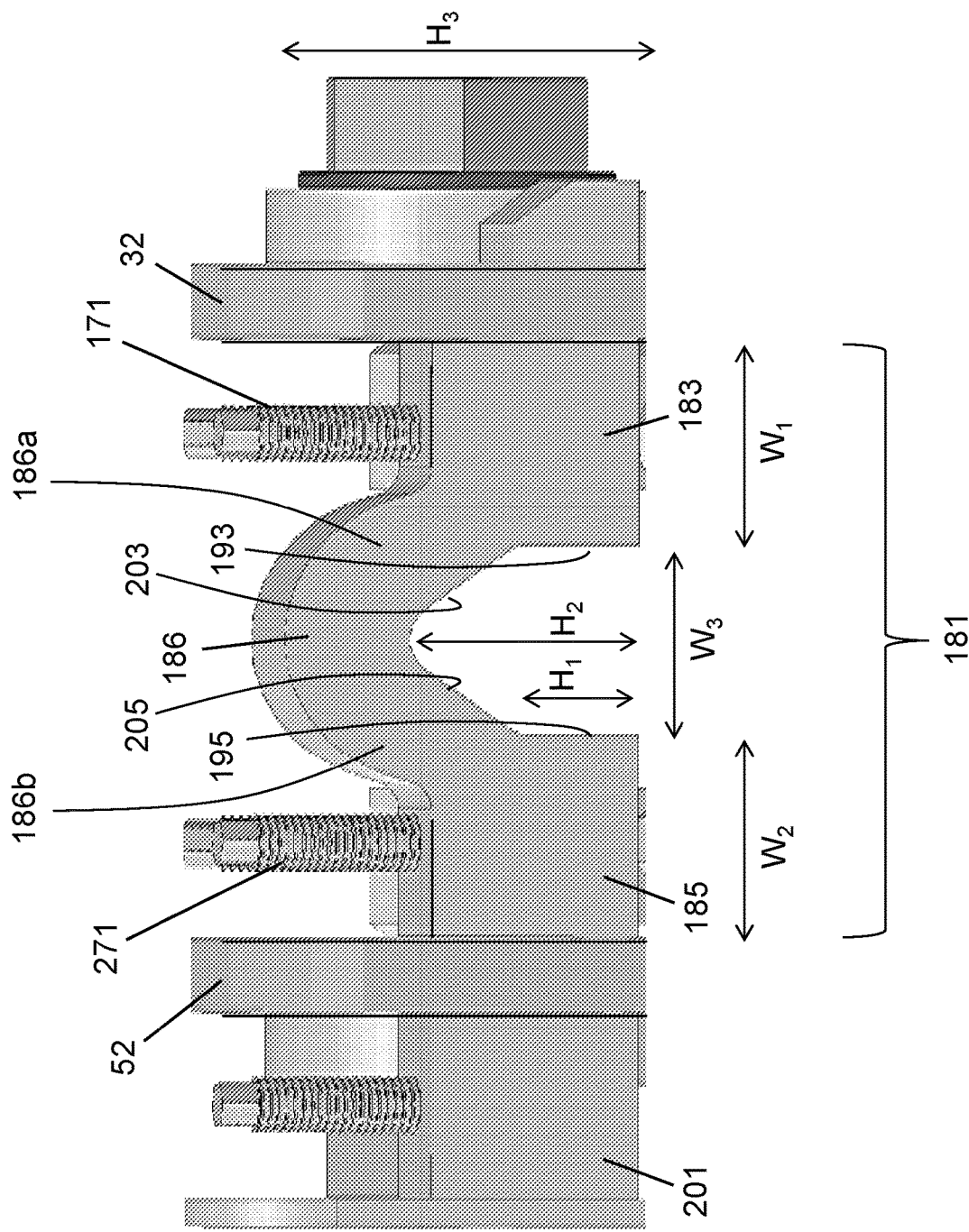
FIG. 6 is a side view showing the bridging member of an embodiment of the clamp apparatus.

For example, with reference to FIGS. 1 and 6, the bridging member 181 can include first portion 183 attached to the lateral inner surface of arm 32 and second portion 185 attached to the lateral inner surface of arm 52. The first portion 183 and second portion 185 can extend inwards towards the medial plane and can have widths $W_1$ and $W_2$, respectively. These widths can be in the range of about 1 inch to about 4 inches, or more preferably about 2 inches to about 3 inches.

The first portion 183 and second portion 185 can have inner lateral surfaces 193 and 195, respectively. The inner lateral surfaces 193 and 195 can have a height $H_1$, which is the distance between the inner radial surface of the first or second portion (183,185) and the beginning of the central portion 186 as defined by surfaces 203 and 205. Height $H_1$ can be in the range of about 0.5 inch to about 2 inches, or more preferably about 1 inch to about 1.5 inches.

The central portion 186 of the bridging member connects the first portion 183 to the second portion 185 but its configuration allows for a gap between the inner lateral surfaces of the first and second portions. The gap can be defined by a width $W_3$. Preferably, the width $W_3$ can be in the range of about 1 inch to about 3 inches, or more preferably about 2 inches to about 2.5 inches. The central portion 186 also may include subportions 186a and 186b that extend laterally inwards and radially outward from the first and second portions (183,185). The central portion can include surfaces 203 and 205 that are at an angle to the radial axis and that face medially and radially inward. The surfaces 203 and 205 can be at an angle to the radial axis in the range of about 30° to 60°, or preferably about 40° to 50°. Surfaces 203 and 205 can meet at an apex, which can define defines a height $H_2$, which can be in the range of about 1 inch to about 3 inches, or more preferably about 1.5 inches to about 2 inches. At the apex, the central portion 186 can have a thickness as defined by the difference between $H_3$ and $H_2$.

The gap between the first and second portions (183,185) can also be defined by the area of the opening as perspectively viewed. For example, the approximate area can be calculated by: $(H_1+H_2)/2 \times W_3$. In some embodiments, the area is in the range of about 2 inches$^2$ to about 4 inches$^2$, or more preferably about 3.25 inches$^2$ to about 3.75 inches$^2$. Further, the volume of the gap between the first and second portions (183,185) can be determined knowing the depth of the bridging member.

Optionally, the apparatus can include one or more extension portion(s) that align with the bridging member, and that are attached to and extend outwards from the outer lateral surface of an arm. For example, with reference to FIG. 7, extension portions (212, 222, and 232) are attached to the outer lateral surface 64 of the arm 42, and extension portions (242, 252, 262) are attached to the outer lateral surface 74 of the arm 52. The outer lateral portion of the extension portions can be attached to small platforms or feet (e.g., see foot 263), which can provide a surface for resting the clamping apparatus on its side when not in use.

The bridging member can also include one or more adjustable supports that are rotatably disposed within a threaded opening of the bridging member. The adjustable support can be the same or similar to the adjustable support that includes a threaded post 71 with base 77 as shown in FIG. 5. For example, referring back to FIG. 6, in some embodiments threaded post 171 and 271 can be rotatably disposed within threaded openings of the first and second portions (183,185), respectively. With reference to FIG. 7, the bases 177 and 277 can be disposed within openings in the first and second portions (183,185) and extendable from these openings from the inner radial surface of the bridging member. Likewise, extension portions (212, 222, 232, 242, 252, 262) can include an adjustable support rotatably disposed within a threaded opening of the extension portion (e.g., 477).

Figure 8:
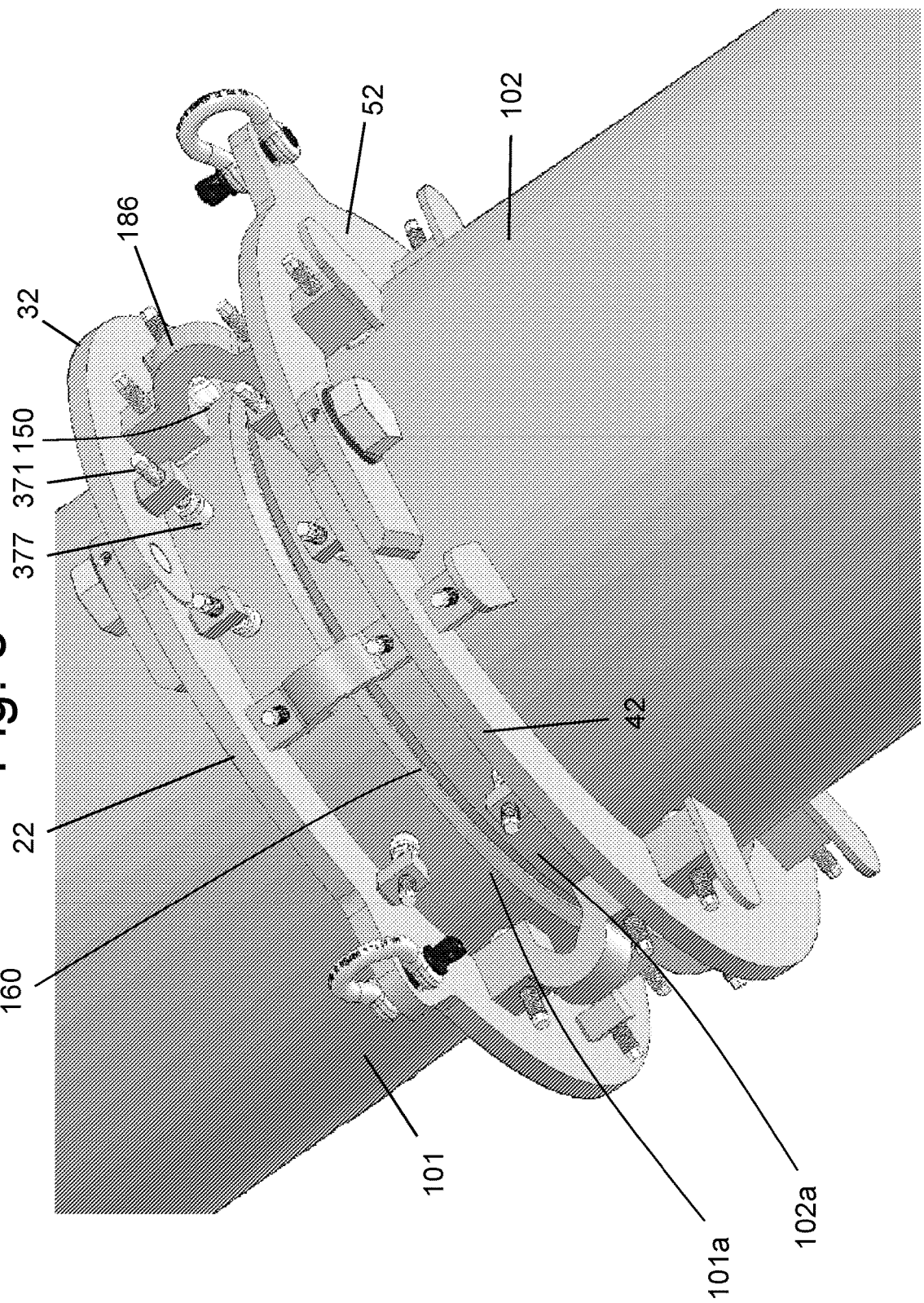
FIG. 8 is a perspective view of an embodiment of the clamp apparatus clamped to pipeline segments at a pipeline junction.

FIG. 8 shows the clamping apparatus attached to two segments of pipeline (101,102). The apparatus aligns and holds the ends of the segments together, allowing for joining of the ends of the pipeline. In a method for joining pipeline segments, one end 101a of a pipeline section 101 is into proximity with one end 102a of a different pipeline section 102.

In some modes of practice, the clamping apparatus may be mounted on one end of a pipeline section prior to the second pipeline section being brought into position to place the ends of the two pipeline sections together. When the end of the second pipeline section is brought into position, the clamp is tightened to hold the two ends together in proper alignment. In other modes of practice, prior to placing the clamping apparatus, the two pipeline ends are aligned. After the ends are aligned the clamping apparatus is placed at the junction between the two pipeline sections. For example, referring to FIGS. 2A and 2B, the arms (122,132) of the clamping apparatus are opened, brought around the diameter of the pipelines, and then when in proper position along the pipeline axis, the arms are closed and the latch is secured.

Referring to FIGS. 4 and 8, the clamping apparatus is arranged to align the medial axis MA with the junction where the two ends of pipeline sections meet. In turn, the gaps that are between the first and second portions (e.g., 283, 285), and radially proximal to the central portion 286, of the bridging member will be aligned with the pipeline junction around its circumference. Accordingly, this will create a continuous open area or "working area" all around the circumference at the pipeline junction (e.g., see FIG. 6 and the gap between surfaces 193 and 195 in the bridging member). Once the pipeline ends and clamping apparatus are is in a desired position, the clamp can be tightened to bring the ends of the pipeline into precise alignment.

Clamp tightening can be achieved by rotating the threaded posts (e.g., 371) radially inwards to force the bases (e.g., 377) to press against the outer surface of a pipeline. Rotating and tightening can be performed for some or all of the threaded posts as desired to provide precise alignment of the two pipeline section ends (e.g., 101a, 102a). The two pipeline section ends (e.g., 101a, 102a) can be tapered so that when aligned a groove 160 is formed at the junction.

With the clamp in place, the pipeline segments can be joined at the junction, such as by welding. The clamping apparatus facilitates the movement of apparatus that can be used to join the segments, such as a welding apparatus. In one mode of practice, the distal end of a welding torch is moved within the gaps that are between the first and second portions (e.g., 183, 185 of FIG. 6) of the bridging member. A weld seam can be formed around the circumference of the pipeline junction within the groove 160 (see FIG. 8). The inventive clamping apparatus can allow welding and pipeline joining with excellent precision and within a fraction of the time it takes using conventional clamps.

After the ends of the pipeline segments are joined, the threaded posts (e.g., 371; see FIG. 8) can be rotated to relive the pressure on the outer surface of a pipeline by the bases (e.g., 377). The latch can be uncoupled and then the arm swung open, and then the apparatus can be lifted from the pipeline.

What is claimed is:

1. A clamp apparatus for joining pipeline segments, the apparatus comprising
    first and second clamp assembly portions that that can form a ring shape in a closed configuration, wherein the first and second clamp assembly portions are parallel to each other and are separated by a gap, and have an inner lateral surface;
    wherein each first and second clamp assembly portions comprise at least first and second arms, wherein the first arm is directly or indirectly attached to and pivotable in relation to the second arm, the arms pivotable to provide the clamp apparatus in open and closed configurations; and
    two or more bridging members positioned within the gap and connecting the first and second clamp assembly portions, wherein the bridging members comprise a first portion, second portion, and central portion, the first and second portions attached to the inner lateral surfaces of the first and second clamp members, respectively, wherein the bridging members are configured so the central portion is radially distal to either the first or second portions and there is a gap between the first and second portions, and wherein the bridging members comprise one or more threaded openings, and one or more adjustable supports rotatably disposed within the threaded openings, the adjustable supports comprising radially proximal pads configured to contact an outer surface of a pipeline.

2. The clamp apparatus of claim 1 wherein the gap between the first and second portions has a distance in the range of 4 inches to 10 inches.

3. The clamp apparatus of claim 2 wherein the gap between the first and second portions has a distance in the range of 6 inches to 8 inches.

4. The clamp apparatus of claim 1 wherein the first portion and second portion define two inner walls that are parallel to each other.

5. The clamp apparatus of claim 4 wherein the central portion defines two inner walls that are at angles to the inner walls defined by the first portion and second portion.

6. The clamp apparatus of claim 5 wherein the two inner walls that are at angles meet at an apex.

7. The clamp apparatus of claim 6 wherein the apex defines a height in the gap, and the height is less than the width of the gap.

8. The clamp apparatus of claim 1 wherein the threaded openings are through the first and second portions of the bridging member.

9. The clamp apparatus of claim 1 comprising support members that extend inwards from the inner lateral surface of the arms but that do not extend to the opposing arm, the support members comprising threaded openings and adjustable supports rotatably disposed within the threaded openings.

10. The clamp apparatus of claim 9 wherein a portion of the support members are disposed at radial intervals between the bridging members.

11. The clamp apparatus of claim 1 comprising a latch pivotably attached to the distal end of the second arm and configured to secure the distal end of the second arm to the distal end of the first arm.

12. A method for joining pipeline segments, the method comprising
  providing a clamp apparatus according to claim 1 on a junction of first and second pipeline segments to align the segments along a pipeline axis at the junction, and
  fixing the first and second pipeline segments together comprising placing a portion of fixing apparatus at a location between the central portion of the bridging member.

13. The method of claim 12 wherein fixing comprises welding the first and second pipeline segments together, and the portion of the fixing apparatus comprise a portion of a welding apparatus.

* * * * *